(12) United States Patent
McMeekin et al.

(10) Patent No.: US 6,676,898 B2
(45) Date of Patent: Jan. 13, 2004

(54) BEARING MATERIALS

(75) Inventors: Kenneth Macleod McMeekin, Kilmarnock (GB); Ian David Massey, Rugby (GB)

(73) Assignee: Dana Corporation, Toledo, OH (US)

( * ) Notice: Subject to any disclaimer, the term of this patent is extended or adjusted under 35 U.S.C. 154(b) by 92 days.

(21) Appl. No.: 09/734,753

(22) Filed: Dec. 11, 2000

(65) Prior Publication Data

US 2001/0006608 A1 Jul. 5, 2001

(30) Foreign Application Priority Data

Dec. 14, 1999 (GB) ................................. 9929425

(51) Int. Cl.⁷ .............................................. C22C 21/00
(52) U.S. Cl. ...................... 420/530; 420/537; 420/551; 420/553
(58) Field of Search .................................. 420/530, 537, 420/551, 553

(56) References Cited

U.S. PATENT DOCUMENTS 5,470,666 A  11/1995  Tanaka et al. ............... 428/653

FOREIGN PATENT DOCUMENTS

| GB | 2266564 A | 4/1993 | |
|----|-----------|--------|---|
| GB | 2271779 A | 10/1993 | |
| GB | 623486 | 5/1999 | .................... 72/82 |

*Primary Examiner*—George Wyszomierski
*Assistant Examiner*—Janelle Combs Morillo
(74) *Attorney, Agent, or Firm*—Rader, Fishman & Grauer PLLC

(57) ABSTRACT

A bearing and a bearing alloy composition are described, the bearing alloy comprising in weight %: tin 5–10; copper 0.7–1.3; nickel 0.7–1.3; silicon 1.5–3.5; vanadium 0.1–0.3; manganese 0.1–0.3; and the balance being aluminium apart from unavoidable impurities.

15 Claims, 5 Drawing Sheets

BEARING MATERIALS

FIELD OF THE INVENTION

The present invention relates to bearing materials comprising aluminium alloys bonded to a strong backing material.

BACKGROUND OF THE INVENTION

Highly rated internal combustion engines have conventionally used crankshaft bearings comprising either a copper based alloy or an aluminum based bearing alloy bonded in some manner to a strong backing or substrate material, such as steel for example. The actual working surface of the bearing alloy, i.e. that surface which faces the engine crankshaft journal surface, has also been provided with a so-called overlay coating which is a thin coating of a relatively softer metal alloy such as lead-tin, lead-tin-copper or lead-indium for example. The purpose of the overlay coating is to provide conformability and dirt embeddability properties to the bearing. Conformability is that property of a bearing that allows the bearing to accommodate slight mechanical misalignments between the bearing and shaft surfaces and is a measure of the ability of the overlay alloy to distribute the applied load. Dirt embeddability is that property that allows debris particles in the lubricating oil to be embedded in the soft overlay alloy without causing damage such as scoring of the shaft. While the technical advantages of overlay coated bearings are not disputed, they have the significant disadvantage of being expensive to make due to the overlay generally being deposited by electroplating, which is a relatively very labor intensive process.

Manufacturers of motor vehicles are more frequently asking for bearings that do not have overlay coatings, as they are cheaper to buy. However, some engines while not possessing a particularly high specific output, due to their design, impose high loads on the crankshaft bearings or possess particularly thin oil films between the bearing and shaft journal and are consequently prone to "scuffing" of the bearing surface. Scuffing is where metal to metal contact between the crankshaft journal surface and the bearing surface occurs, i.e. the oil film at the point of contact is ruptured allowing metal to metal contact, without actual seizure and consequent failure of the bearing. However, while overlay coated bearings are especially scuff resistant, most of the conventional copper and aluminum based alloys are relatively poor in terms of scuff resistance. The ability to withstand scuffing is a measure of the conformability of the alloy. In contrast to scuffing, seizure is related to lack of compatibility of the alloy.

One known material comprising: aluminium-6 weight % tin-1 weight % copper-1 weight % nickel has good scuff resistance but has a relatively low fatigue strength and toughness in the non-overlay plated condition, which renders it unsuitable for more modern highly rated engines. The low fatigue strength and toughness is a reflection of the low ductility of this alloy.

To cope with the stresses imposed by modern engines, an alloy having significantly improved mechanical properties, namely, tensile strength (15%); hardness (15%); and fatigue strength (16%) than one of the strongest known aluminum bearing alloys comprising: aluminum-12 weight % tin-4 weight % silicon-1 weight % copper that is in a solution heat treated form, is required. While the strength of this alloy could be raised by increasing the copper content, it is difficult and expensive to make by the conventional production method of casting billets, rolling to size and roll-pressure bonding to steel due to the small size reductions that are possible at each rolling pass before annealing heat treatment is required.

GB-A-2271779 describes an aluminum/tin/silicon bearing alloy which may further comprise at least one of the elements Mn, Mg, V, Ni, Cr, Zr, and/or B at between 0.1 and 3.0 weight % per element. In addition to these elements, the alloy further contains 0.2 to 5.0 weight % Cu, 0.1 to 3.0 weight % Pb, 0.1 to 3.0 weight % Sb and 0.01 to 1.0 weight % Ti as additional alloying elements. It is explained that if the content of the optional elements Mn, Mg, V, Ni, Cr, Zr, and B rises above 3.0 weight %, the conformability of the bearing may deteriorate and workability of the bearing alloy can be degraded.

GB-A-2266546 is also concerned with aluminum-based bearing alloys similar to GB'779 described above. In this case, the alloy also preferably includes at least one or two further elements comprising: from 0.2 to 5.0 weight % Cu, from 0.1 to 3.0 weight % Pb, from 0.1 to 3.0 weight % Sb, Mn, Mg, V and Ni and 0.01 to 1.0 weight % Ti, with the total amount of Mn, Mg, V and Ni being in the range from 0.01 to 3.0 weight %.

However, alloys made according to the teachings of the above two documents are virtually unprocessable by the normal production methods of casting and rolling followed by roll-pressure bonding due to lack of ductility and brittleness of the alloys. This is the case when the alloying element contents are a small fraction of those quoted.

SUMMARY OF THE INVENTION

The present invention provides a bearing that includes an aluminum-based bearing alloy having greater strength and scuff resistance than known bearing alloys while retaining ease of manufacture.

BRIEF DESCRIPTION OF THE DRAWINGS

In order that the present invention may be more fully understood, an example will now be described by way of illustration only with reference to the accompanying drawings, of which.

DETAILED DESCRIPTION OF THE PREFERRED EMBODIMENT

Figure 1:
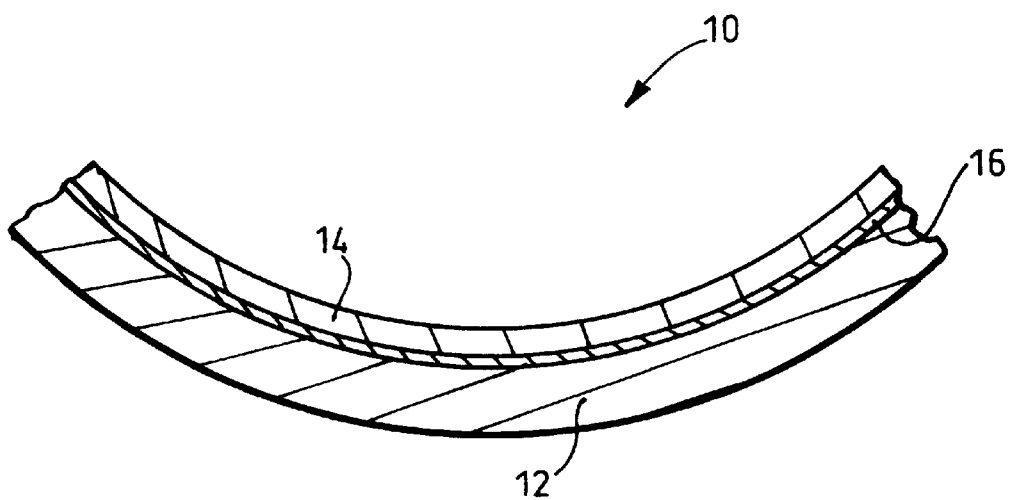
FIG. 1 is a cross section view through part of a bearing utilizing the alloy of the present invention and showing the constituent layers.

According to an embodiment of the present invention, a bearing alloy composition is provided comprising in weight %: tin 5–10; copper 0.7–1.3; nickel 0.7–1.3; silicon 1.5–3.5; vanadium 0.1–0.3; manganese 0.1–0.3; with the balance being aluminum apart from unavoidable impurities. Preferably, the tin content lies in the range from 5.5–7 weight %.

Bearing testing has shown that when the silicon content falls below 1.5 weight % then the incidences of seizure increases. When the silicon content exceeds 3.5 weight % then the silicon network tends to be coarser and the incidence of cracking during alloy processing, by rolling for example, increases significantly necessitating additional in process heat treatments and small rolling reductions per pass thus, increasing the cost of production. Preferably, the silicon content is maintained within the range from 2 to 3 weight %.

The additions of copper and nickel are well known strengthening additions for aluminium alloy bearing materials. Additions below 0.7 weight % do not produce the required strengthening effect whereas additions above 1.3 weight % render the alloy difficult to process. At higher contents of copper and nickel, only relatively small rolling reductions are possible before annealing heat treatments are required which increases the cost of the material.

Vanadium has the effect of increasing the toughness of the alloy. Below 0.1 weight % the effect diminishes rapidly whereas above 0.3 weight % there is an embrittling effect. Preferably, the vanadium content is maintained at a maximum of 0.2 weight %.

Manganese, in addition to being a chemical alloy strengthener, is a well known grain refining agent producing small grains and greater strength than would otherwise be the case without it. Below 0.1 weight % the grain refining effect is small where as above 0.3 weight % manganese, alloy processing becomes difficult and expensive necessitating reduced rolling reductions per pass and additional heat treatments.

It has been determined that the combination of the two additional elements of vanadium and manganese in small quantities within the limits prescribed above has a synergistic effect wherein the strength of the alloy is raised significantly and, as importantly, the conformability and compatibility of the alloy are not adversely affected to any significant extent. Tests have shown that the alloy shows improved fatigue strength and resistance to scuffing at comparable loads to known strong aluminum alloys while retaining ease of manufacture and low processing costs. However, in the types of engine applications for which this alloy is intended it is the combination of the increased mechanical strength properties together with improved scuff resistance and acceptable seizure resistance that is the surprising effect of the alloy composition of the present invention.

According to a second embodiment of the present invention, there is provided a plain bearing comprising a strong backing material and having bonded thereto a layer of a bearing alloy having a composition comprising in approximate weight %: tin 5–10; copper 0.7–1.3; nickel 0.7–1.3; silicon 1.5–3.5; vanadium 0.1–0.3; manganese 0.1–0.3; with the balance being aluminium apart from unavoidable impurities. The bearing may also include an interlayer of relatively pure aluminum or an aluminum alloy material between the bearing alloy and the strong backing material. The strong backing material may be steel or bronze for example. It has been found that the ductility of the alloy containing both vanadium and manganese is significantly greater than alloys containing only one of these additions. It is believed that this feature is responsible for the improved scuff resistance of the material.

While the material of the present invention is primarily intended to be used in relatively highly loaded engines prone to scuffing due to low oil film thickness under arduous operating conditions for example, it will be appreciated by those people skilled in the bearings art that this material would operate perfectly satisfactorily with an overlay coating of the type described hereinabove.

FIG. 1 is a cross-sectional view through part of the circumferential length of a substantially semi-cylindrical half bearing 10 through a plane normal to the axis of the bearing. The bearing 10 comprises a steel backing layer 12 having a layer 14 of a bearing alloy thereon with a thin interlayer 16 of relatively pure aluminum therebetween. The production process for the bearing will be understood from the example production schedule described below.

Bearings produced from the material described above were formed into half bearings for testing. The bearings had a wall thickness 1.75 mm comprising a steel thickness of 1.5 mm and a lining thickness of 0.25 mm. Other comparative alloys having a composition as set out in Table 1 below were made into bearings of the same dimensions and tested under the same conditions.

TABLE 1

| Material | Composition | | | | | | |
|---|---|---|---|---|---|---|---|
| | Sn | Si | Ni | Cu | V | Mn | Al |
| Comparative 1 | 12 | 4 | — | 1 | — | — | Bal |
| Comparative 2 | 20 | — | — | 1 | — | — | Bal |
| Comparative 3 | 12 | 4 | — | 2 | — | — | Bal |
| Inventive bearing alloy | 6 | 2.5 | 1 | 1 | 0.2 | 0.25 | Bal |

Mechanical properties of the above alloys are set out below in Table 2.

TABLE 2

| | Mechanical Properties | | | | |
|---|---|---|---|---|---|
| Material | Lining Hardness (HV2.5) | UTS (Mpa) | % Elong to Fracture | Toughness* | Al Grain Size ($\mu$m) |
| Comparative 1 | 47 | 150 | 20 | 20 | 17 |
| Comparative 2 | 40 | 120 | 23 | 18 | 16 |
| Comparative 3 | 47 | 150 | 18 | 19 | 17 |
| Inventive bearing alloy | 52 | 180 | 21 | 25 | 12 |

*Where toughness = (0.66 × UTS) × Elong to Fracture, it is the relationship between strength and ductility. It is a rating and has no units.

Referring to Table 2, it may be seen that the inventive alloy is not only stronger than the comparative alloys, but has lost no ductility relative to alloys 1 and 3, which are also aluminium-tin-silicon-copper alloys.

Figure 4A:
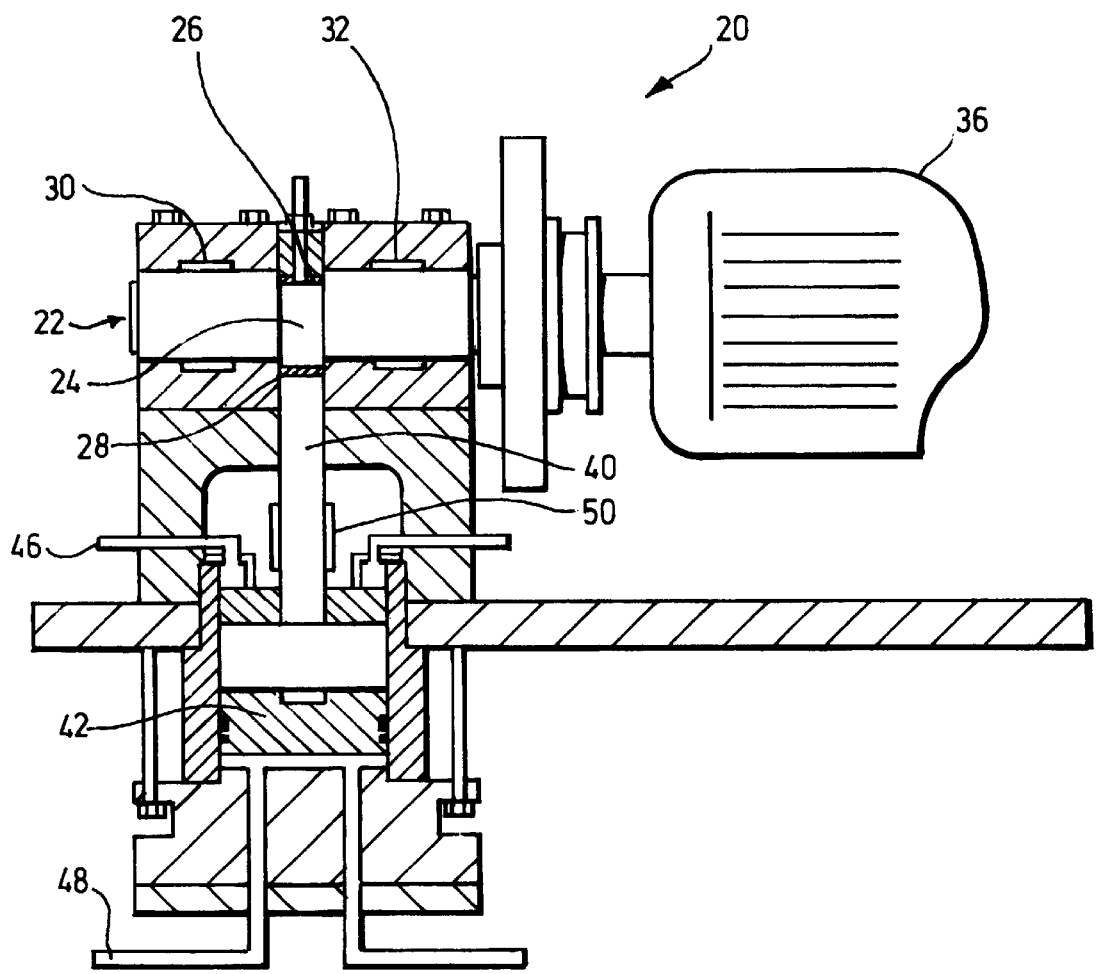
FIGS. 4A to 4C show a partial cross section of a test apparatus for determining scuff and seizure ratings and graphs indicating the test regimes for fatigue (4B) and scuff/seizure (4C) testing.
Figure 4B:
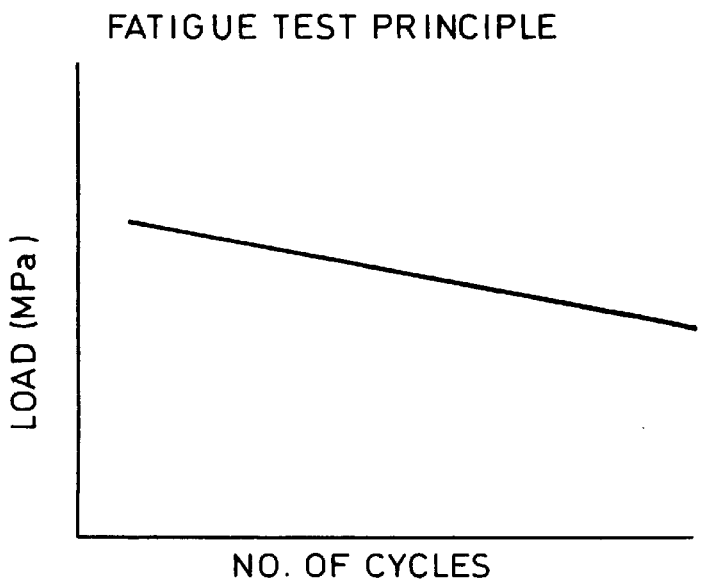
Figure 4C:
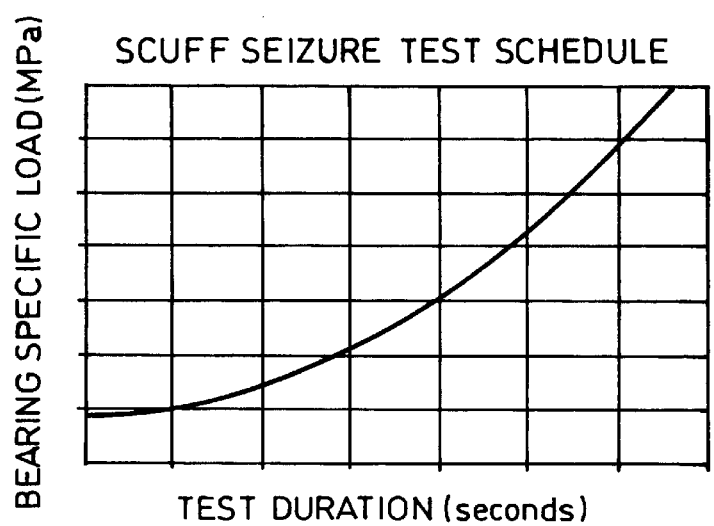

The bearings were tested to determine the fatigue strength thereof, the load at which scuffing occurred and the ultimate load at which seizure occurred. The tests were carried out in a known Sapphire apparatus 20 as shown in FIG. 4A. The apparatus 20 comprises a test shaft 22 having a central eccentric portion 24 supported by the test bearings 26, 28 and the outer ends of shaft 22 supported in slave bearings 30, 32. The shaft 22 is rotated by a drive motor 36 and a load is applied to the test bearings 26, 28 by a connecting rod 40 to which is applied a force by a piston 42 which is actuated by hydraulic means 46, 48. Strain gauges 50 measure the applied load. FIGS. 4B and 4C show typical regimes for fatigue and scuff/seizure testing. The fatigue load capacity is that load which causes fatigue at 200 hours running. In operation, the apparatus shown at FIG. 4A applies a load to the test bearings 26, 28 by means of the eccentric portion 24 and the hydraulically loaded piston 42 thus imposing a sinusoidal dynamic load on the bearings. Via a computer control system (not shown), a programmed progressive load increase becomes the basis of the measurement of surface properties. Upon increasing the load, the minimum oil film thickness steadily reduces and the test measures, via the temperature increase, the load at which the material is wiped or scuffed as it comes into contact with the geometrical inaccuracies in the shaft and/or the load at which the material welds itself to the shaft. Scuff resistance is a measure of material conformability while seizure resistance is a measure of compatibility.

FIG. 4B is an illustrative schematic graph showing that as the load on a bearing increases, the number of cycles that it can withstand prior to fatigue diminishes. FIG. 4C illustrates a scuff/seizure testing schedule. An increasing load is applied to a test bearing until scuffing or seizure occurs. Scuffing or seizure is generally indicated by a rise in temperature at the bearing surface. Scuffing tends to be a momentary temperature rise whereas seizure is a prolonged temperature rise accompanied by a fall in oil pressure. The test results are shown below in Table 3.

TABLE 3

| Material | Sapphire L-N Fatigue 200 hr Load Capacity | Relative Sapphire scuff resistance | Relative Sapphire seizure resistance |
| --- | --- | --- | --- |
| Comparative 1 | 1.14 | 0.74 | 0.95 |
| Comparative 2 | 1 | 1 | 1 |
| Comparative 3 | 1.14 | 0.53 | 1 |
| Inventive Alloy | 1.34 | 0.81 | 0.81 |

The relative bearing properties shown in Table 3 are based on 18 tests for the inventive alloy and a minimum of 60 tests for each of the comparative alloys. In the Table Al20Sn1Cu alloy (comparative alloy 2) is given a base-line rating of 1 against which all the other alloys, including the inventive alloy, are rated. Thus, the fatigue strength of the inventive alloy is 34% greater than comparative alloy 2, for example.

Figure 2:
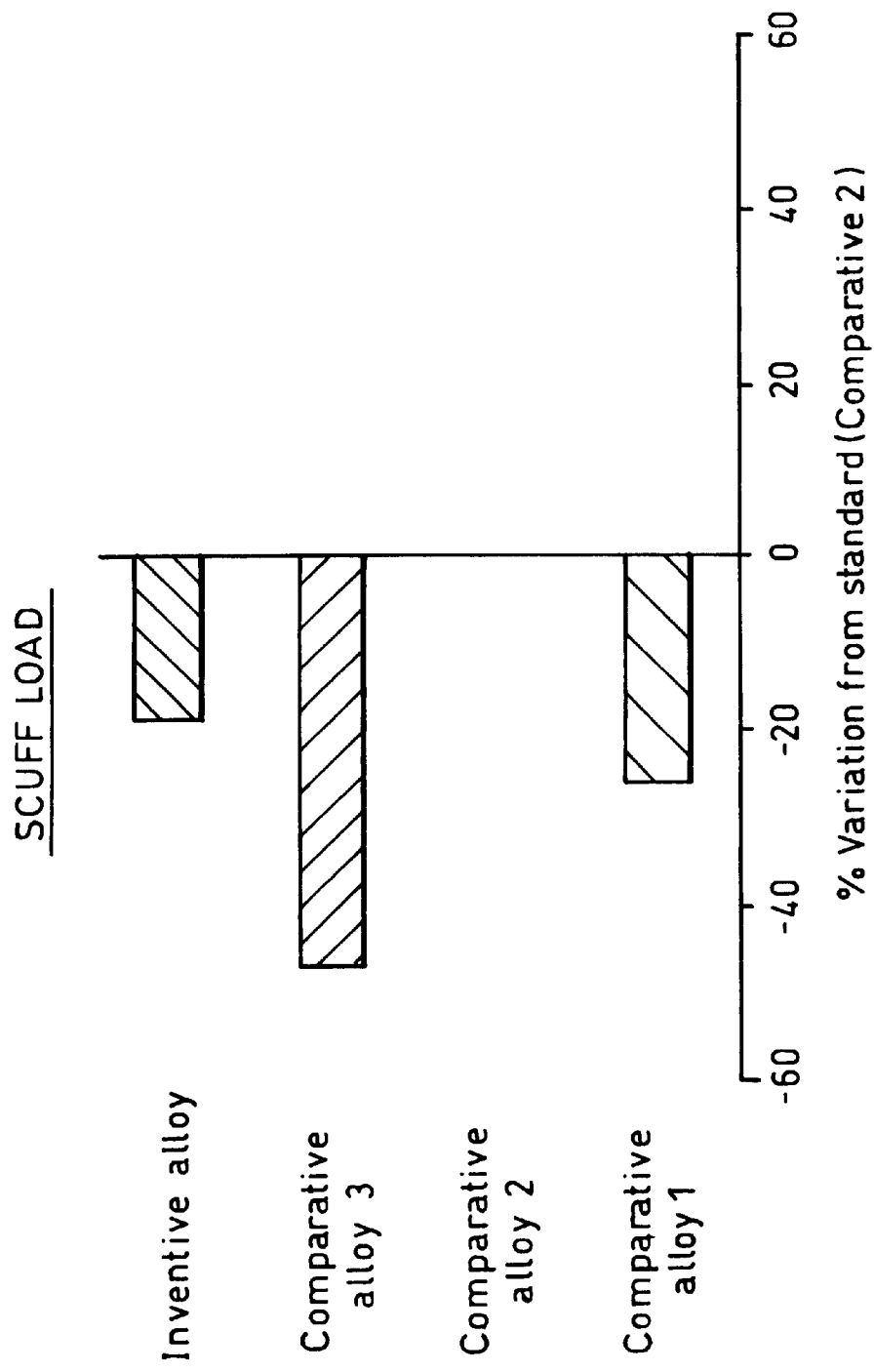
FIG. 2 is a histogram showing relative scuff resistance results for an alloy according to the present invention and for three comparative alloys.
Figure 3:
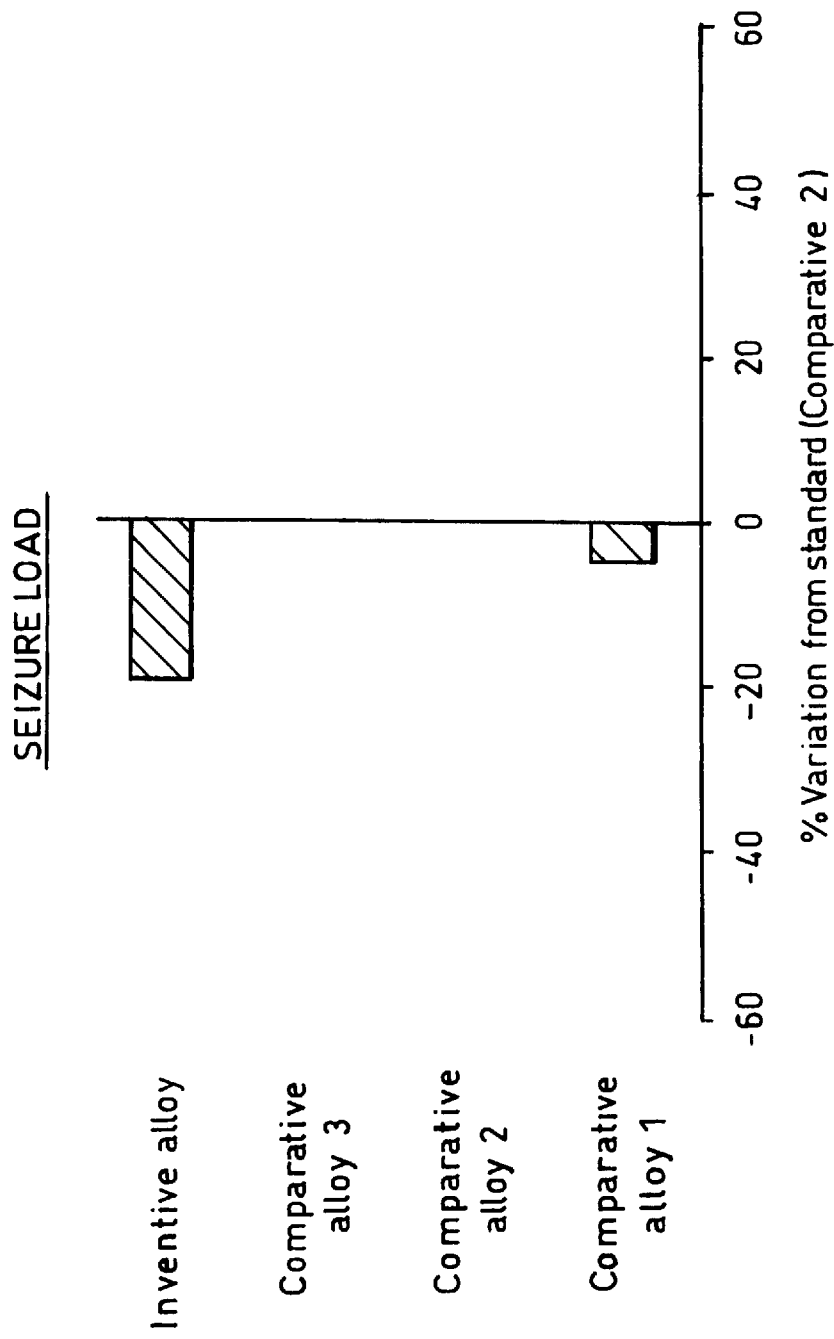
FIG. 3 is a histogram showing relative seizure results for the alloys according to FIG. 2.

As may be seen from Table 3, the fatigue strength of the alloy according to the present invention is significantly higher than the three comparative alloys and although lower in actual seizure resistance it also has improved scuff resistance relative to the other known Al/Sn/Si comparative alloys 1 and 3. The results shown in Table 3 are also depicted graphically in FIGS. 2 and 3.

In essence the material according to the present invention has a significantly greater fatigue strength than know alloys while retaining an entirely adequate resistance to both scuffing and seizure. Thus, the alloys according to the present invention are particularly useful for those engines requiring a higher fatigue strength and scuff resistance than known silicon containing alloys, but do not require an especially high seizure resistance rating.

What is claimed is:

1. A bearing alloy composition consisting essentially of in approximate weight %: tin 5–10; copper 0.7–1.3; nickel 0.7–1.3; silicon 1.5–3.5; vanadium 0.1–0.3; manganese 0.1–0.3; with the balance being aluminum and unavoidable impurities.

2. A bearing alloy according to claim 1, wherein the tin content lies in the range of approximately 5.5–7 weight %.

3. A bearing alloy according to claim 1, wherein the silicon content is maintained within the range of approximately 2–3 weight %.

4. A bearing alloy according to claim 1, wherein the vanadium content is a maximum of approximately 0.2 weight %.

5. A bearing alloy according to claim 1, wherein the tin content lies in the range of approximately 5.5–7 weight %, the silicon content is maintained within the range of approximately 2–3 weight %, and the vanadium content is a maximum of approximately 0.2 weight %.

6. A plain bearing comprising a strong backing material and having bonded thereto a layer of a bearing alloy having a composition consisting essentially of in approximate weight %: tin 5–10; copper 0.7–1.3; nickel 0.7–1.3; silicon 1.5–3.5; vanadium 0.1–0.3; manganese 0.1–0.3; and with the balance being aluminum and unavoidable impurities.

7. A plain bearing according to claim 6, the bearing further including an interlayer of relatively pure aluminum or an aluminum alloy material between the bearing alloy and the strong backing material.

8. A plain bearing according to claim 6, wherein the strong backing material is selected from steel and bronze.

9. A plain bearing according to claim 6, wherein an outer surface of the bearing alloy is provided with and overlay coating layer.

10. A plain bearing comprising a strong backing material and having bonded thereto a layer of a bearing alloy having a composition consisting essentially of in approximate weight %: tin 5–10; copper 0.7–1.3; nickel 0.7–1.3; silicon 1.5–3.5; vanadium 0.1–0.3; manganese 0.1–0.3; with the balance being aluminum and unavoidable impurities;

an interlayer of relatively pure aluminum or an aluminum alloy material between the bearing alloy and the strong backing material;

wherein the strong backing material is selected from steel and bronze; and wherein an outer surface of the bearing alloy is provided with and overlay coating layer.

11. The composition of claim 1, wherein the amount of vanadium and the amount of manganese are selected to increase the strength of the alloy without adversely impacting the conformability and compatibility.

12. A bearing alloy composition, consisting essentially of: about 5 to about 10 wt % tin; about 0.7 to about 1.3 wt % copper; about 0.7 to about 1.3 wt % nickel; about 1.5 to about 3.5 wt % silicon; about 0.1 to about 0.3 wt % vanadium; about 0.1 to about 0.3 wt % manganese; and the balance being aluminum and unavoidable impurities, wherein the amount of vanadium and the amount of manganese are selected to increase the strength of the alloy without adversely impacting the conformability and compatibility.

13. The composition of claim 12, wherein the tin content lies in the range of approximately 5.5–7 weight %, the silicon content is maintained within the range of approximately 2–3 weight %, and the vanadium content is a maximum of approximately 0.2 weight %.

14. An alloy composition, consisting essentially of: about 5 to about 10 wt % tin; about 0.7 to about 1.3 wt % copper; about 0.7 to about 1.3 wt % nickel; about 1.5 to about 3.5 wt % silicon; about 0.1 to about 0.3 wt % vanadium; about 0.1 to about 0.3 wt % manganese; and the balance being aluminum and unavoidable impurities, wherein the alloy can be processed by casting and rolling, followed by roll-pressure bonding.

15. The composition of claim 14, wherein the tin content lies in the range of approximately 5.5–7 weight %, the silicon content is maintained within the range of approximately 2–3 weight %, and the vanadium content is a maximum of approximately 0.2 weight %.

* * * * *